Dec. 29, 1970    J. MENELL    3,551,044
WALL MODULE FOR OPTICAL REAR PROJECTION SYSTEMS
Filed Jan. 12, 1968    2 Sheets-Sheet 1

United States Patent Office 3,551,044
Patented Dec. 29, 1970

3,551,044
WALL MODULE FOR OPTICAL REAR PROJECTION SYSTEMS
Jerome Menell, 30 E. 42nd St.,
New York, N.Y. 10017
Filed Jan. 12, 1968, Ser. No. 697,477
Int. Cl. G03b 21/26, 21/28
U.S. Cl. 353—94                              1 Claim

ABSTRACT OF THE DISCLOSURE

An optical projection system including a rear projection translucent screen, a plurality of optical projectors, a pivotally mounted mirror disposed behind said screen, and selectively positionable with respect to the principal projection axis of each of said projectors to reflect said axes along the medial axis of said screen, to eliminate distortion in a projected image.

---

This invention relates generally to the field of optical rear projection systems, and more particularly to improved modules which can be conveniently installed in conference rooms to permit ready availability of any of a plurality of different types of projectors.

A primary requirement for such systems is that all of the projectors must be located so as to selecetively project an image upon a single screen or viewing area, so that it will not be necessary to disturb the position of persons viewing the same depending upon the type of material being projected. In order to avoid distortion, it is essential that the projection axis of the projector in use meet the optical center of the projection screen. Where a plurality of projectors are selectively in use, some means must be provided for accomplishing this while eliminating movement and alignment of each projector as it is moved to comply with the above condition. This movement is both undesirable and time consuming. In common use in the art are 35 mm. transparency projectors, 16 and 8 mm. motion picture projectors, 3¼ inch by 4 inch transparency projectors and overhead projectors capable of projecting images from transparent subject projectors upon a common supporting surface, and to rematter. While it is known in the art to locate various projectors upon a common supporting surface, and to reflect light rays therefrom upon a single screen, owing to the angular disposition of the axis of projection with respect to the principal axis of the screen, images have been distorted to a greater or lesser degree, to produce an effect commonly known as "keystoning." Such an effect is undesirable, and in some cases completely unacceptable. It is a concomitant of the necessity of locating the projectors at varying angles with respect to the reflective mirror, the angles being in turn a concomitant of the necessity of accommodating various space limitations.

It is therefore among the principal objects of the present invention to provide improved projection systems in which the above mentioned effect is completely eliminated.

Another object of the invention lies in the provision of improved rear projection systems incorporating a pivotally mounted reflective mirror selectively positionable to receive light rays from a selected projector, and reflect the same upon a rear projection screen without distortion.

Yet another object of the invention lies in the provision of optical rear projection systems possesssed of the above advantage which may occupy a minimum of space within a given room.

A feature of one of the disclosed embodiments lies in the provision of a projector positioned forwardly of the rear projection screen, thus permitting convenient manipulation by a lecturer.

These objects, as well as other incidental ends and advantages, will more fully appear in the progress of the following disclosure, and be pointed out in the appended claim.

In the drawings, to which reference will be made in the specification, similar reference characters have been employed to designate corresponding parts throughout the several views.

Figure 1:
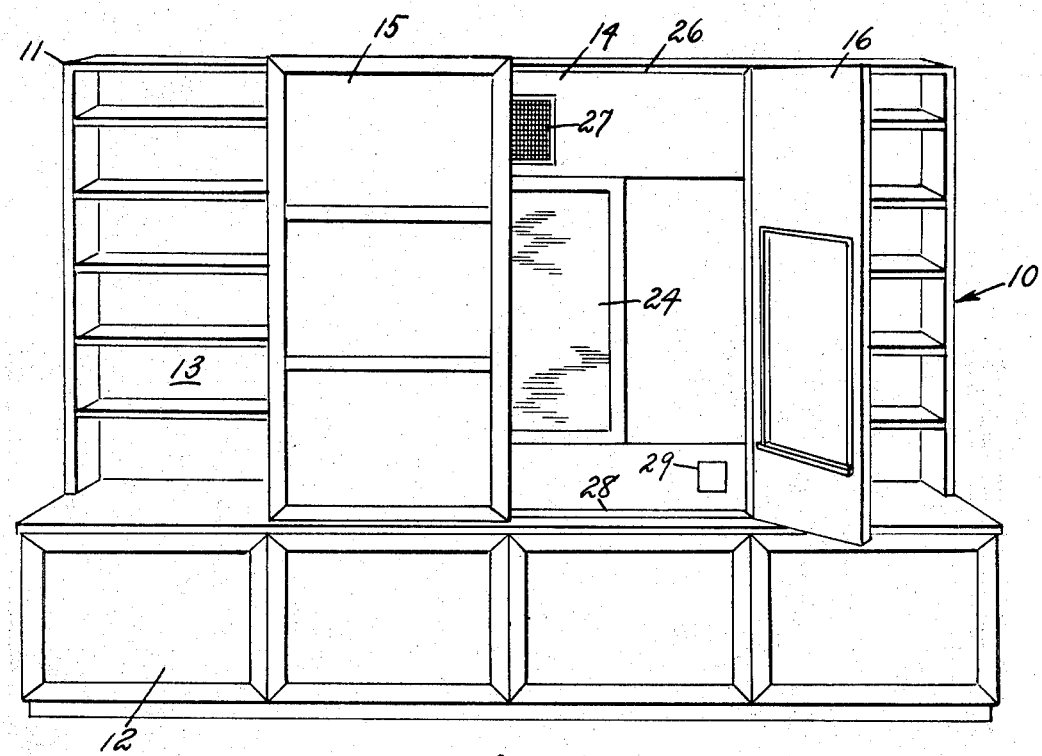
FIG. 1 is a perspective view of a first embodiment of the invention.

In accordance with the first embodiment of the invention, generally indicated by reference character 10, there is provided a storage wall 11 which may be conveniently built against one wall of a room, including a lower storage area 12, an upper book shelf area 13, and a centrally disposed projection compartment 14 selectively enclosed by first and second swinging doors 15 and 16.

Figure 2:
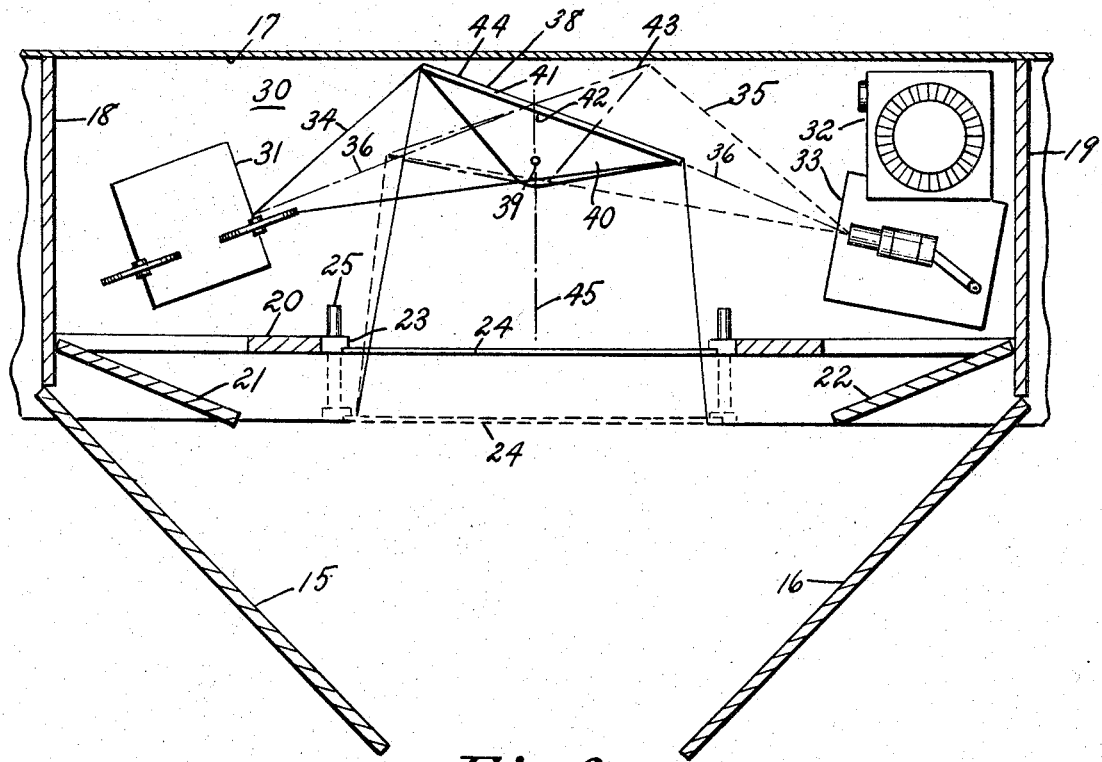
FIG. 2 is a schematic top plan view of the first embodiment.

Referring to FIG. 2 in the drawing, the projection compartment 14 includes a back panel 17, side wall panels 18 and 19, as well as a forward wall 20 which may be provided with left and right access doors 21 and 22, respectively. A central opening 23 mounts a projection screen 24 which may include a telescoping mount 25, depending upon space limitations. Adjacent an upper edge 26 of the forward wall 20 is a speaker 27 conveniently connectable through a control panel 29 adjacent a lower edge 28.

A lower horizontal wall 30 mounts a first projector 31, of 16 mm. motion picture type; a second projector 32 of 35 mm. slide transparency type, and a third projector 33 of overhead type. Each of the projectors 31–33 inclusive, has solid angle of projection as at 34–35, about a principal projection axis 36.

Mounted behind the screen 24 is a reflective mirror element 38, capable of rotation about the axis of a discontinuous shaft 39 which mount supporting brackets 40. An externally silvered mirror 41 includes a reflective surface 42 positionable in any one of a number of predetermined positions, two of which are indicated by reference characters 43 and 44, in such position that the principal projection axis 36 of the selected projector will strike the surface 42 at the point where the same lies on the principal axis 45 of the screen. Where more than one projector is involved, it will be apparent that the axis of rotation of the mirror must be displaced and parallel to the surface 42, as is apparent from a consideration of FIG. 2.

Thus, irrespective of the location of the projectors 31–33, there is an angular position of the mirror element 38 with respect to the screen 24 which will meet this requirement, and irrespective of the particular projector selected for use, the resulting image upon the screen will be free of distortion.

Figure 3:
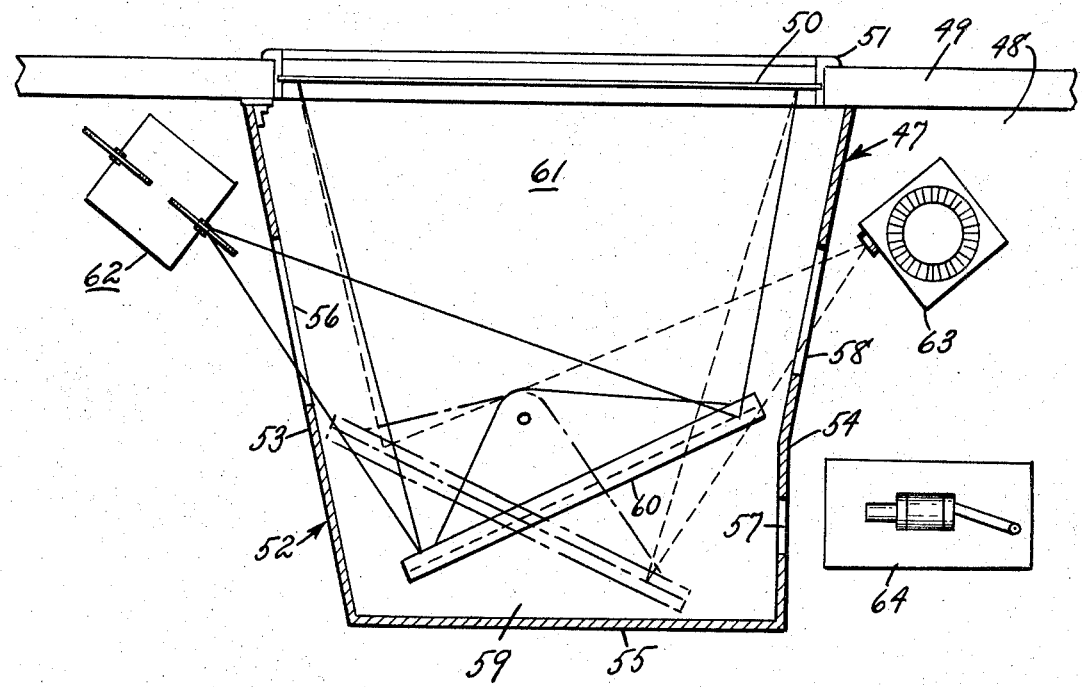
FIG. 3 is a fragmentary schematic top plan view of a second embodiment of the invention.

The second embodiment of the invention, generally indicated by reference character 47 is particularly suitable for use where space is available behind the wall of a room which mounts the projection screen, and the necessity of the storage wall 11 of the first embodiment is eliminated. Thus, as seen in FIG. 3, the available space 48 is disposed behind the wall 49, and the rear projection screen 50 is mounted directly within a framed opening 51.

The opening 51 is surrounded by a rearwardly positioned casing element 52 including side walls 53 and 54, and a rear wall 55. Openings 56, 57 and 58 are provided to permit passage of light rays from externally disposed projectors into the chamber 59 formed by the casing element 52 to fall upon the pivotally mounted mirror element 60.

A horizontal wall 61 supports first, second and third projectors, 62, 63 and 64, respectively. Operation of the second embodiment is substantially identical to that in the first embodiment.

Figure 4:
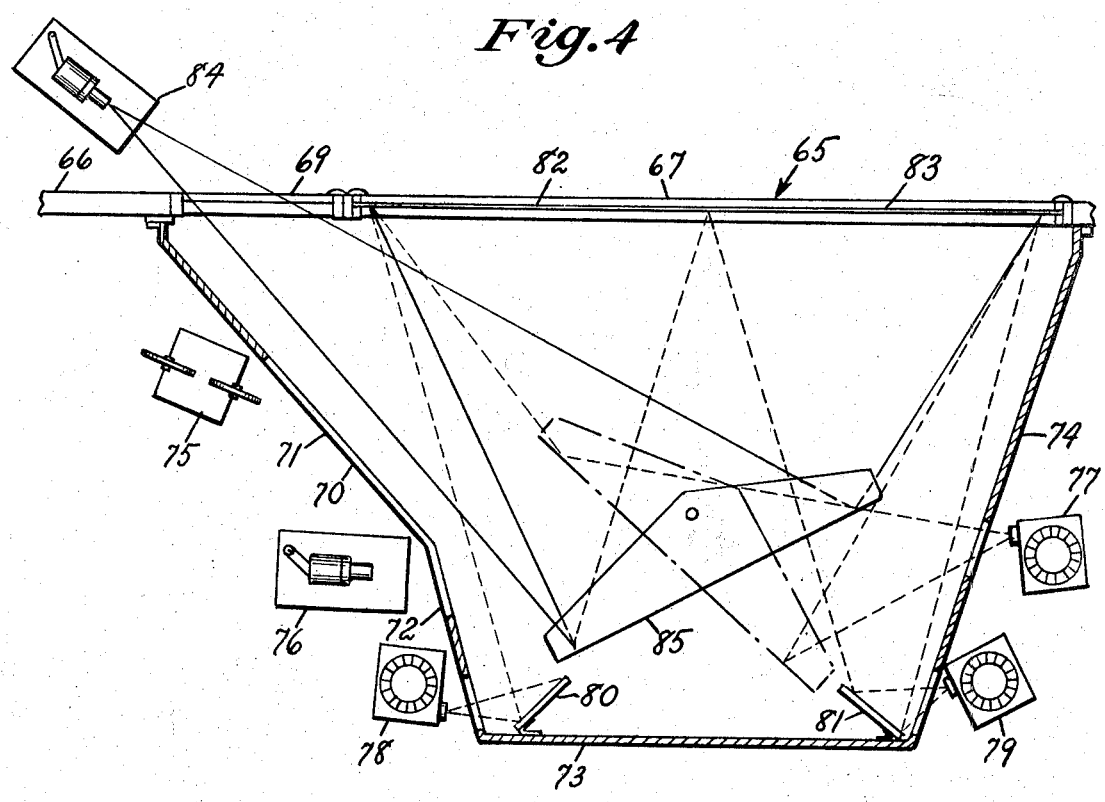
FIG. 4 is a fragmentary schematic top plan view of a third embodiment of the invention.

Turning now to the third embodiment of the invention illustrated in FIG. 4, and generally indicated by reference character 65, this construction is particularly suited for installations where a relatively larger number of projectors is required, one of which is preferably located near the position of a speaker or lecturer for convenient manual operation.

Thus, the main wall 66 of the room is provided with a first opening 67 for accommodation of a rear projection screen 68, and a second adjacent opening 69 provides for the passage of light rays through the wall 66 to the interior of the rear housing 70.

The housing 70 includes a plurality of vertically disposed walls 71, 72, 73, and 74. First, second and third projectors 75, 76 and 77, respectively are of types employed in the first and second embodiments. In addition, there are provided comparative projectors 78 and 79, each cooperating with angularly disposed mirrors 80 and 81 to reflect images received from the projectors to cover approximately one-half of the area of the projection screen, as indicated by reference characters 82 and 83.

Forwardly of the wall 66 is a manually operated overhead projector 84 which projects through the opening 69 to reflect images from the mirror 85.

I wish it to be understood that I do not consider the invention limited to the precise details of structure shown and set forth in this specification, for obvious modifications will occur to those skilled in the art to which the invention pertains.

I claim:
1. An optical rear screen projection system comprising: a planar translucent screen element having a centrally located principal screen axis perpendicular to the plane thereof, a plurality of optical projectors, at least two of said plurality of projectors being positioned on the same side of the principal screen axis, each having an optical axis of projection lying substantially in a common plane, said principal screen axis also lying within said common plane, each of the optical axes of projection intersecting said principal screen axis at a different point therealong; a planar mirror, means mounting said mirror for movement about an axis of rotation parallel to the plane thereof, and in spaced relation thereto, said axis of rotation being perpendicular to said common plane, and lying in said screen axis; whereby said mirror may be selectively positioned upon rotation to lie in the point of intersection of said principal screen axis, and the optical projection axis of each of said projectors.

References Cited

UNITED STATES PATENTS

| | | | |
|---|---|---|---|
| 2,031,361 | 2/1936 | Bowen | 353—34 |
| 2,727,429 | 12/1955 | Jenkins | 352—89 |
| 3,040,622 | 6/1962 | Reddle et al. | 353—78 |
| 3,283,652 | 11/1966 | Busch | 353—94 |
| 3,352,200 | 11/1967 | Berger | 353—37 |
| 3,376,782 | 4/1968 | Whitley et al. | 353—94 |

FOREIGN PATENTS

| | | | |
|---|---|---|---|
| 648,936 | 1/1951 | Great Britain | 353—77 |

HARRY N. HAROIAN, Primary Examiner

U.S. Cl. X.R.

353—77